(12) United States Patent
Kawase et al.

(10) Patent No.: US 12,142,725 B2
(45) Date of Patent: Nov. 12, 2024

(54) BATTERY (71) Applicant: Panasonic Intellectual Property Management Co., Ltd., Osaka (JP)

(72) Inventors: Akira Kawase, Osaka (JP); Kouji Nishida, Osaka (JP); Yasutaka Tsutsui, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 625 days.

(21) Appl. No.: 17/375,109

(22) Filed: Jul. 14, 2021

(65) Prior Publication Data
US 2021/0344041 A1 Nov. 4, 2021

Related U.S. Application Data (63) Continuation of application No. PCT/JP2019/045584, filed on Nov. 21, 2019.

(30) Foreign Application Priority Data

Feb. 15, 2019 (JP) ................. 2019-026043

(51) Int. Cl.
H01M 10/0562 (2010.01)
H01M 4/139 (2010.01)
(Continued)

(52) U.S. Cl.
CPC ....... H01M 10/0562 (2013.01); H01M 4/139 (2013.01); H01M 4/66 (2013.01);
(Continued)

(58) Field of Classification Search
CPC ......... H01M 10/0562; H01M 10/0564; H01M 10/0585; H01M 2300/0065; H01M 2300/0094
See application file for complete search history.

(56) References Cited

U.S. PATENT DOCUMENTS 9,843,071 B2 * 12/2017 Kato ................. H01M 10/0562
2005/0019666 A1 * 1/2005 Yasuda ............. H01M 10/0525
29/623.5
(Continued)

FOREIGN PATENT DOCUMENTS

CN 100537656 C * 9/2009 ............. H01G 11/48
CN 108630996 A * 10/2018 .......... H01M 10/052
(Continued)

OTHER PUBLICATIONS

Machine translation of JP 2001-351615 (no date) (Year: 0000).*
(Continued)

Primary Examiner — Amanda C. Walke
(74) Attorney, Agent, or Firm — Rimon P.C.

(57) ABSTRACT

A battery includes a first electrode, a first solid electrolyte layer in contact with the first electrode, a second electrode, and a second solid electrolyte layer located between the second electrode and the first solid electrolyte layer and in contact with the second electrode and the first solid electrolyte layer. An organic compound content of the first solid electrolyte layer is smaller than an organic compound content of the second solid electrolyte layer, and a thickness of the first solid electrolyte layer is smaller than a thickness of the second solid electrolyte layer.

6 Claims, 3 Drawing Sheets (51) Int. Cl.
  *H01M 4/66* (2006.01)
  *H01M 10/0525* (2010.01)
  *H01M 10/0564* (2010.01)
  *H01M 10/0585* (2010.01)

(52) U.S. Cl.
  CPC ... *H01M 10/0525* (2013.01); *H01M 10/0564* (2013.01); *H01M 10/0585* (2013.01)

(56) References Cited

U.S. PATENT DOCUMENTS

| | | | |
|---|---|---|---|
| 2007/0048617 | A1 | 3/2007 | Inda |
| 2012/0231354 | A1 | 9/2012 | Matsuda et al. |
| 2018/0337422 | A1* | 11/2018 | Iwamoto ........... H01M 10/0562 |
| 2019/0363368 | A1* | 11/2019 | Koga ................ H01M 10/0562 |
| 2021/0143474 | A1* | 5/2021 | Sugimoto ........... H01M 10/052 |

FOREIGN PATENT DOCUMENTS

| | | | | | |
|---|---|---|---|---|---|
| CN | 108963320 | A | | 12/2018 | |
| CN | 109904514 | A | * | 6/2019 | |
| CN | 112864454 | A | * | 5/2021 | |
| CN | 115117460 | A | * | 9/2022 | ........ H01M 10/0525 |
| EP | 4117058 | A1 | * | 1/2023 | ........ H01M 10/0562 |
| JP | 2001351615 | A | * | 12/2001 | .......... H01M 10/052 |
| JP | 2004-095342 | | | 3/2004 | |
| JP | 2005-044663 | | | 2/2005 | |
| JP | 2007-066703 | | | 3/2007 | |
| JP | 2015-008073 | | | 1/2015 | |
| JP | 2015-118870 | | | 6/2015 | |
| JP | 2016-117640 | | | 6/2016 | |
| JP | 2018-195573 | | | 12/2018 | |
| WO | 2011/065483 | | | 6/2011 | |

OTHER PUBLICATIONS

Translation of PCT written opinion ETWOS (no date) (Year: 0000).*
International Search Report of PCT application No. PCT/JP2019/045584 dated Feb. 4, 2020.
English Translation of Chinese Search Report dated May 20, 2024 for the related Chinese Patent Application No. 201980082329.8.

* cited by examiner

BATTERY

BACKGROUND

1. Technical Field

The present disclosure relates to a battery.

2. Description of the Related Art

Japanese Patent No. 6175934 discloses a method for producing an all-solid-state battery including a negative electrode forming step, a first solid electrolyte layer forming step, a positive electrode forming step, a second solid electrolyte layer forming step, a stacking step, and a bonding step. In this production method, the first solid electrolyte layer and the second solid electrolyte layer are formed from a slurry composition containing a binder.

Japanese Unexamined Patent Application Publication No. 2015-118870 discloses a method for producing an all-solid-state battery including the step of bonding a first layered body and a second layered body together such that a first solid electrolyte layer overlaps a second solid electrolyte layer. In this production method, the first layered body is formed by bonding a positive electrode layer and the first solid electrolyte layer together. The second layered body is formed by bonding a negative electrode layer and the second solid electrolyte layer together. The first solid electrolyte layer and the second solid electrolyte layer are formed from a slurry containing a solid electrolyte and a binder.

Japanese Unexamined Patent Application Publication No. 2016-117640 discloses a method for producing a solid electrolyte from a suspension produced by a catalytic reaction of a solid electrolyte material in a solvent. A battery containing a solid electrolyte produced by this method is also disclosed.

SUMMARY

There is a demand for a battery with improved reliability and capacity compared with the related art.

In one general aspect, the techniques disclosed here feature a battery that includes a first electrode, a first solid electrolyte layer in contact with the first electrode, a second electrode, and a second solid electrolyte layer located between the second electrode and the first solid electrolyte layer and in contact with the second electrode and the first solid electrolyte layer, wherein an organic compound content of the first solid electrolyte layer is smaller than an organic compound content of the second solid electrolyte layer, and a thickness of the first solid electrolyte layer is smaller than a thickness of the second solid electrolyte layer.

The present disclosure can provide a battery with high reliability and capacity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

For example, an all-solid-state battery is composed of stacked unit cells, which are basic constituents. The unit cell includes a first electrode, a second electrode, and a solid electrolyte layer between the first electrode and the second electrode. The unit cell is hereinafter simply referred to as a "cell".

Important characteristics required for the solid electrolyte layer are to decrease the thickness to increase the capacity and to prevent a short circuit caused by electrical contact between the first electrode and the second electrode. For example, the thickness of a solid electrolyte layer composed only of one layer can be decreased by decreasing the particle size of a solid electrolyte material used as a raw material. However, a solid electrolyte material with a small particle size has a large specific surface area. Thus, the use of a solid electrolyte material with a small particle size to form a solid electrolyte layer increases the amount of organic compound, such as binder, required to prepare a slurry of the solid electrolyte material. An increase in the amount of organic compound causes an increase in the electrical resistance of the solid electrolyte layer and makes it difficult to increase the capacity and power of the battery. Furthermore, a decrease in the thickness of the solid electrolyte layer increases the likelihood of a defect, such as a pinhole, in the solid electrolyte layer. For these reasons, a decrease in the thickness of the solid electrolyte layer makes it difficult to increase the capacity and to prevent a short circuit in the solid electrolyte layer.

The present inventors have intensively studied a solid electrolyte layer that can have the important characteristics, and have reached a battery according to the present disclosure.

Embodiments

A battery according to an embodiment of the present disclosure is described below with reference to the appended drawings. A battery according to the present disclosure is not limited to the following embodiments. The same or equivalent constituents are denoted by the same reference numerals and are sometimes not described again.

Figure 1:
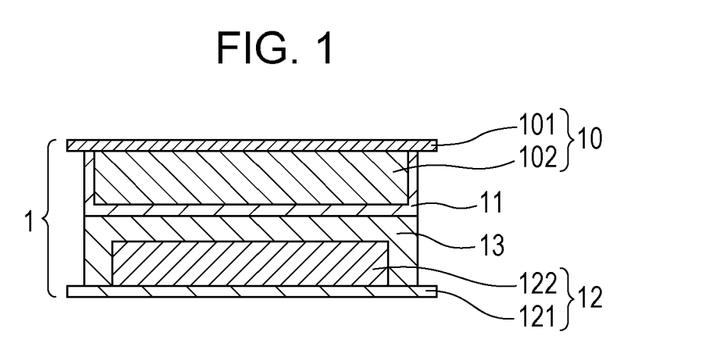
FIG. 1 is a schematic cross-sectional view of an example of a cell according to an embodiment of the present disclosure.

FIG. 1 is a schematic cross-sectional view of an example of a cell according to an embodiment of the present disclosure. A cell 1 illustrated in FIG. 1 is a unit cell that is a basic constituent of a stacked all-solid-state battery 2 described later. The cell 1 includes a first electrode 10, a first solid electrolyte layer 11, a second electrode 12, and a second solid electrolyte layer 13. The first solid electrolyte layer 11 is in contact with the first electrode 10. The second solid electrolyte layer 13 is located between the second electrode 12 and the first solid electrolyte layer 11. The second solid electrolyte layer 13 is in contact with the second electrode 12 and the first solid electrolyte layer 11. The organic compound content of the first solid electrolyte layer 11 is smaller than the organic compound content of the second solid electrolyte layer 13. The first solid electrolyte layer 11 has a smaller thickness than the second solid electrolyte layer 13.

When the first solid electrolyte layer 11 contains only one organic compound, the organic compound content of the first solid electrolyte layer 11 is the amount of the organic compound. When the first solid electrolyte layer 11 contains a plurality of organic compounds, the organic compound content of the first solid electrolyte layer 11 is the total amount of the organic compounds. When the second solid electrolyte layer 13 contains only one organic compound, the organic compound content of the second solid electrolyte layer 13 is the amount of the organic compound. When the second solid electrolyte layer 13 contains a plurality of organic compounds, the organic compound content of the second solid electrolyte layer 13 is the total amount of the organic compounds.

An organic compound in the solid electrolyte layer can be identified, for example, by an energy dispersive X-ray analysis (EDX) of a cross section of the solid electrolyte layer.

The organic compound content of the solid electrolyte layer can be determined, for example, by thermogravimetry and differential thermal analysis (TG-DTA). An organic compound in the solid electrolyte layer, which is a dry film, is burned off, for example, by infrared drying of the solid electrolyte layer. The organic compound content of the solid electrolyte layer can be calculated by measuring the mass change of the solid electrolyte layer due to the burning off. An alternative method may be Fourier transform infrared spectroscopy (FT-IR).

The thickness of each of the first solid electrolyte layer 11 and the second solid electrolyte layer 13 may be an average of values measured at a plurality of points (at least three points, for example, three points or five points). The thickness of each solid electrolyte layer can be measured on a micrograph of a section or fracture surface. The micrograph can be taken with a scanning electron microscope, a laser microscope, or an optical microscope. The thickness of each layer other than the solid electrolyte layers can be determined in the same manner.

The cell 1 is described in more detail below.

The first electrode 10 includes a first current collector 101 and a first active material layer 102. The first active material layer 102 is located on and is in contact with the first current collector 101. The first solid electrolyte layer 11 may cover the surface of the first active material layer 102 located on the first current collector 101. In other words, the first solid electrolyte layer 11 may cover the surface of the first active material layer 102 except the interface between the first current collector 101 and the first active material layer 102. The first solid electrolyte layer 11 covering the surface of the first active material layer 102 may have a thickness of 5 μm or less. The first solid electrolyte layer 11 covering the surface of the first active material layer 102 can more reliably prevent an electrical short circuit. The first solid electrolyte layer 11 may cover the entire surface of the first active material layer 102 except the interface between the first current collector 101 and the first active material layer 102. In FIG. 1, as an example, the first solid electrolyte layer 11 covers the entire surface of the first active material layer 102 except the interface between the first current collector 101 and the first active material layer 102. It is sufficient, however, if the first solid electrolyte layer 11 is located between the first electrode 10 and the second solid electrolyte layer 13. Thus, the first solid electrolyte layer 11 may not cover the entire side surface of the first active material layer 102.

The second electrode 12 includes a second current collector 121 and a second active material layer 122. The second active material layer 122 is located on and is in contact with the second current collector 121. For example, the second solid electrolyte layer 13 may cover the surface of the second active material layer 122. In other words, the second solid electrolyte layer 13 may cover the surface of the second active material layer 122 except the interface between the second current collector 121 and the second active material layer 122. The second solid electrolyte layer 13 may cover the entire surface of the second active material layer 122 except the interface between the second current collector 121 and the second active material layer 122. In FIG. 1, as an example, the second solid electrolyte layer 13 covers the entire surface of the second active material layer 122 except the interface between the second current collector 121 and the second active material layer 122. It is sufficient, however, if the second solid electrolyte layer 13 is located between the second electrode 12 and the first solid electrolyte layer 11. Thus, the second solid electrolyte layer 13 may not cover the entire side surface of the second active material layer 122.

In other words, the cell 1 has a structure in which the first electrode 10 faces the second electrode 12 with the first solid electrolyte layer 11 and the second solid electrolyte layer 13 interposed therebetween. The cell 1 has a solid electrolyte layer composed of the first solid electrolyte layer 11 and the second solid electrolyte layer 13. The total thickness of the first solid electrolyte layer 11 and the second solid electrolyte layer 13 is required to have the following important characteristics: (i) the total thickness should be decreased to increase the capacity of the battery and (ii) the total thickness should be sufficient to prevent a short circuit caused by electrical contact between the first active material layer 102 and the second active material layer 122.

Only the first solid electrolyte layer 11 or the second solid electrolyte layer 13 may be sufficient to drive the cell 1. In order that the cell 1 can consistently have the required characteristics (i) and (ii) and in view of the possibility of a defect in the solid electrolyte layer, however, it is considered undesirable to form the solid electrolyte layer composed only of the first solid electrolyte layer 11 or the second solid electrolyte layer 13. For example, in a solid electrolyte layer composed of a single layer, a solid electrolyte material with a small particle size is used to form a thin solid electrolyte layer. As described above, this increases the amount of organic compound, such as binder, required to prepare a slurry of the solid electrolyte material, and the solid electrolyte layer thus formed generally contains a large amount of the organic compound. Consequently, the solid electrolyte layer has generally high electrical resistance. A decrease in the thickness also increases the likelihood of a defect, such as a pinhole, throughout the solid electrolyte layer. Thus, a simple decrease in the thickness of a solid electrolyte monolayer may rather degrade the characteristics, that is, make it difficult to prevent a short circuit, and decrease the capacity.

In the cell 1 according to the present embodiment, the solid electrolyte layer includes two layers of the first solid electrolyte layer 11 and the second solid electrolyte layer 13. Furthermore, the first solid electrolyte layer 11 has a smaller thickness and a smaller organic compound content than the second solid electrolyte layer 13. Thus, the first solid electrolyte layer 11 can decrease the thickness of the entire solid electrolyte layer and does not cause characteristic degradation due to an increase in the organic compound content. Furthermore, to form the second solid electrolyte layer 13 with a larger thickness, it is not necessary to use a solid electrolyte material with a small particle size to decrease the thickness. This is less likely to cause a defect, such as a pinhole. The second solid electrolyte layer 13 therefore improves the function of preventing a short circuit in the entire solid electrolyte layer. Thus, the solid electrolyte layer of the cell 1 includes the first solid electrolyte layer 11, which can decrease the thickness without increasing the organic compound content, and the second solid electrolyte layer 13, which is less likely to have a defect, such as a pinhole, and can reliably prevent a short circuit. Thus, the cell 1 can consistently have the required characteristics (i) and (ii). It should be noted that a solid electrolyte layer composed of three or more layers has a large thickness and cannot consistently have the required characteristics (i) and (ii). Furthermore, a solid electrolyte layer composed of three or more layers has an increased number of different interfaces and cannot consistently have the required characteristics (i) and (ii).

The first solid electrolyte layer 11 may have a thickness of 0.5 µm or more and 5 µm or less, or 1 µm or more and 3 µm or less. The first solid electrolyte layer 11 with a thickness in this range can reduce the risk of a film defect in a method of formation described later and more reliably prevent an electrical short circuit.

The organic compound content of the first solid electrolyte layer 11 may be 0.5% or less by mass. When the organic compound content of the first solid electrolyte layer 11 is 0.5% or less by mass, the thickness of the entire solid electrolyte layer can be decreased without an increase in electrical resistance. Thus, the cell 1 can more consistently have the required characteristics (i) and (ii).

It is possible that the first solid electrolyte layer 11 contains no organic compound. This enables the cell 1 to more consistently have the required characteristics (i) and (ii). The phrase "the first solid electrolyte layer 11 contains no organic compound" means that no organic compound is intentionally used to form the first solid electrolyte layer 11. Thus, for example, when a material used inevitably contains a minute amount of organic compound and consequently a minute amount of, for example, 0.2% or less by mass of, organic compound remains in the first solid electrolyte layer 11 formed, it is understood that the first solid electrolyte layer 11 contains no organic compound.

The second solid electrolyte layer 13 may have a thickness of 3 µm or more and 50 µm or less, or 5 µm or more and 30 µm or less. The second solid electrolyte layer 13 with a thickness of 3 µm or more can more reliably prevent an electrical short circuit. The second solid electrolyte layer 13 with a thickness of 50 µm or less can increase the capacity of the cell 1.

In the following embodiment, the first electrode 10 is a negative electrode, the first solid electrolyte layer 11 is a solid electrolyte layer on the negative electrode side, the second electrode 12 is a positive electrode, and the second solid electrolyte layer 13 is a solid electrolyte layer on the positive electrode side.

The first electrode 10 and the second electrode 12 can be a negative electrode and a positive electrode, respectively, used in known all-solid-state batteries (for example, lithium-ion batteries).

The first current collector 101 can be a negative-electrode current collector used in known all-solid-state batteries (for example, lithium-ion batteries). For example, Cu foil, Al foil, and stainless steel foil can be used. The first current collector 101 may have a thickness of 5 µm or more and 100 µm or less.

A negative-electrode active material used in known all-solid-state batteries (for example, lithium-ion batteries) can be used for the first active material layer 102. For example, known negative-electrode active materials, such as graphite and metallic Li, can be used. Active materials for use in the first active material layer 102 are not limited to these and can be various materials from which ions, such as Li or Mg, can be released and into which the ions can be inserted. A material other than the active material in the first active material layer 102 may be a solid electrolyte, such as a sulfide solid electrolyte or an oxide solid electrolyte. The sulfide solid electrolyte may be a mixture of $Li_2S$ and $P_2S_5$. The first active material layer 102 may further contain a conductive aid, such as acetylene black, and a binder, such as poly(vinylidene difluoride). The first active material layer 102 may have a thickness of 5 µm or more and 300 µm or less.

The second current collector 121 can be a positive-electrode current collector used in known all-solid-state batteries (for example, lithium-ion batteries). For example, Cu foil, Al foil, and stainless steel foil can be used. The second current collector 121 may have a thickness of 5 µm or more and 100 µm or less.

A positive-electrode active material used in known all-solid-state batteries (for example, lithium-ion batteries) can be used for the second active material layer 122. For example, known positive-electrode active materials, such as lithium cobalt oxide and LiNO, can be used. Active materials for use in the second active material layer 122 are not limited to these and can be various materials from which ions, such as Li or Mg, can be released and into which the ions can be inserted. A material other than the active material in the second active material layer 122 may be a solid electrolyte, such as a sulfide solid electrolyte or an oxide solid electrolyte. The sulfide solid electrolyte may be a mixture of $Li_2S$ and $P_2S_5$. The second active material layer 122 may further contain a conductive aid, such as acetylene black, and a binder, such as poly(vinylidene difluoride). The second active material layer 122 may have a thickness of 5 µm or more and 300 µm or less.

Any solid electrolyte material, such as a sulfide solid electrolyte, a halogen solid electrolyte, or an oxide solid electrolyte, can be used for the first solid electrolyte layer 11. The sulfide solid electrolyte may be a mixture of $Li_2S$ and $P_2S_5$. A solution produced by reacting the solid electrolyte material in a solvent to form an emulsion can be used as a coating slurry for forming the first solid electrolyte layer 11. Japanese Unexamined Patent Application Publication No. 2016-117640 discloses a method for synthesizing an emulsion of a solid electrolyte material in a solvent. A solution produced by synthesizing an emulsion of a solid electrolyte material in a solvent is hereinafter referred to as an "emulsion solution". An emulsion solution can be used as a coating slurry for forming the first solid electrolyte layer 11 to produce the first solid electrolyte layer 11 with a small thickness and with a low organic compound content, for example, the first solid electrolyte layer 11 with a thickness of 0.5 µm or more and 5 µm or less and with an organic compound content of 0.5% or less by mass.

For example, a solid electrolyte material powder with an average particle size of 0.5 µm or less may be used to form the first solid electrolyte layer 11. A solid electrolyte material with a small particle size has a large specific surface area. Thus, the preparation of a slurry of such a solid electrolyte material with a small particle size by a conventional method requires an increased amount of organic compound, such as binder. Such an increase in the amount of organic compound causes an increase in the electrical resistance of the solid electrolyte layer and makes it difficult to increase the capacity and power of the battery. On the other hand, when a solid electrolyte material powder with an average particle size of 0.5 μm or more and 20 μm or less is used to form the first solid electrolyte layer 11 with a thickness of 0.5 μm or more and 5 μm or less in the same manner as in the formation of the second solid electrolyte layer 13 described later, the solid electrolyte material powder is difficult to tightly pack, and the solid electrolyte layer is less likely to prevent a short circuit. In contrast to these methods, in a method of using the emulsion solution as a coating solution, it is not necessary to increase the amount of organic compound, such as binder, to prepare a coating slurry even when a solid electrolyte material with a small particle size is used. Thus, the first solid electrolyte layer 11 with a small thickness and with a low organic compound content can be produced.

The average particle size of the solid electrolyte material herein refers to D50 (the median size of the volumetric distribution) determined from the volumetric particle size distribution measured with a laser diffraction scattering particle size distribution analyzer.

The first solid electrolyte layer 11 may contain an organic compound. An organic compound, if present, in the first solid electrolyte layer 11 imparts flexibility to the first solid electrolyte layer 11 in the step of forming the first solid electrolyte layer 11 to cover the first active material layer 102 and therefore facilitates the formation of the first solid electrolyte layer 11 with fewer defects. An organic compound, if present, in the first solid electrolyte layer 11 can also provide bonding adhesiveness between the first solid electrolyte layer 11 and the second solid electrolyte layer 13. Even in such a case, the organic compound content of the first solid electrolyte layer 11 may be 0.5% or less by mass.

The first solid electrolyte layer 11 may also be formed by a method other than the method of using the emulsion solution. For example, the first solid electrolyte layer 11 can be produced by using as a coating solution a dispersion liquid containing fine particles of a solid electrolyte material with an average particle size of 0.2 μm or less dispersed in a dispersion medium.

Any solid electrolyte material, such as a sulfide solid electrolyte, a halogen solid electrolyte, or an oxide solid electrolyte, can be used for the second solid electrolyte layer 13. The sulfide solid electrolyte may be a mixture of $Li_2S$ and $P_2S_5$. For example, a powder with an average particle size of 0.5 μm or more and 20 μm or less can be used as a solid electrolyte material to form the second solid electrolyte layer 13 with a thickness of 3 μm or more and 50 μm or less.

The second solid electrolyte layer 13 can be formed by kneading a powder of a solid electrolyte material and a solvent with an organic compound, such as poly(vinylidene difluoride) or an elastomer, to prepare a coating slurry and applying the coating slurry to the second active material layer 122 to cover the second active material layer 122.

If necessary, the coating slurry used to form the second solid electrolyte layer 13 may contain the organic compound in an amount of 0.5% or more by mass and 10% or less by mass of the total solid content. The organic compound in an amount of 0.5% or more by mass can sufficiently maintain the thickness of the second solid electrolyte layer 13 and therefore improves the function of preventing an electrical short circuit in the entire solid electrolyte layer. The organic compound in an amount of 10% or less by mass can cause a smaller increase in electrical resistance and therefore allows an increase in the capacity and power of the battery.

Thus, the second solid electrolyte layer 13 has a larger thickness and a higher organic compound content than the first solid electrolyte layer 11. This structure can reduce the risk of short circuit, increase the capacity of the cell 1, and stabilize the capacity quality of the cell 1.

Although not illustrated in FIG. 1, the cell 1 may include a sealing member in a region between the first current collector 101 and the second current collector 121 outside a power generating element. The power generating element is composed of the first active material layer 102, the first solid electrolyte layer 11, the second active material layer 122, and the second solid electrolyte layer 13. The sealing member may have insulating properties. The sealing member can prevent water infiltration into the interior of the cell 1 or can maintain the structure of the cell 1 and prevent a short circuit caused by contact between the first current collector 101 and the second current collector 121. Consequently, the cell 1 can maintain its mechanical strength.

A thermoplastic resin can be used as a sealing material for the sealing member. The use of the thermoplastic resin increases the choice of material. A thermosetting resin and a photocurable resin may also be used as the sealing materials. These may be used alone or in combination. A sealing material with a sufficiently high glass transition temperature can provide a sealing member with sufficient sealing strength. To enhance the function of the sealing member, the sealing material may include another material, such as a functional powder or fiber. The other material may be inorganic filler or silica gel. Inorganic filler can strengthen the structure retentivity. Silica gel can enhance water resistance. Such functional powders and fibers may be used alone or in combination.

Next, an example of a method for producing the cell 1 according to a first embodiment is described below. However, a method for producing a cell according to the present disclosure is not limited to this.

Materials for the first current collector 101, the first active material layer 102, the second current collector 121, the second active material layer 122, the first solid electrolyte layer 11, and the second solid electrolyte layer 13 are as described above.

First, an example of a method for producing the first electrode 10 is described below. A material for the first active material layer 102 and a solvent are kneaded to prepare a coating slurry. The solvent may be a known solvent used to form a negative-electrode active material layer of known all-solid-state batteries (for example, lithium-ion batteries). The coating slurry is applied to the first current collector 101 and is dried to form the first active material layer 102. The dry film may be pressed to increase the density of the first active material layer 102. The first electrode 10 thus formed includes the first active material layer 102 located on and in contact with the first current collector 101.

The first electrode 10 may have a larger area than the second electrode 12. Such a structure can prevent problems caused by precipitation of Li or Mg.

Next, the first solid electrolyte layer 11 is formed on the first active material layer 102 of the first electrode 10. For example, to form the first solid electrolyte layer 11 with a thickness of 0.5 μm or more and 5 μm or less, an emulsion solution of a solid electrolyte material for the first solid electrolyte layer 11 can be used as a coating solution to form the first solid electrolyte layer 11, as described above. In the step of forming the first solid electrolyte layer 11, to impart flexibility to the first solid electrolyte layer 11 so as to easily cover the first active material layer 102, and to improve bonding adhesiveness between the first solid electrolyte layer 11 and the second solid electrolyte layer 13, a coating solution (for example, an emulsion solution) for forming the first solid electrolyte layer 11 may contain an organic compound in an amount of 0.5% or less by mass of the total solid content.

The first solid electrolyte layer 11 can be formed by a coating method, such as a die coating method, a doctor blade method, a roll coater method, a screen printing method, or an ink jet method, and may be formed by another method. In particular, for an emulsion solution used as a coating solution to form the first solid electrolyte layer 11, for example, a spray method and an ink jet method are preferably used.

In this way, a layered body including the first solid electrolyte layer 11 on the first electrode 10 is formed on the first electrode side.

Next, an example of a method for producing the second electrode 12 is described below. A material for the second active material layer 122 and a solvent are kneaded to prepare a coating slurry. The solvent may be a known solvent used to form a positive-electrode active material layer of known all-solid-state batteries (for example, lithium-ion batteries). The coating slurry is applied to the second current collector 121 and is dried to form the second active material layer 122. The dry film may be pressed to increase the density of the second active material layer 122. The second electrode 12 thus formed includes the second active material layer 122 located on and in contact with the second current collector 121.

Next, the second solid electrolyte layer 13 is formed on the second active material layer 122 of the second electrode 12. For example, a powder with an average particle size of 0.5 μm or more and 20 μm or less can be used as a solid electrolyte material to form the second solid electrolyte layer 13 with a thickness of 3 μm or more and 50 μm or less. A powder of a solid electrolyte material for the second solid electrolyte layer 13, an organic compound, such as poly (vinylidene difluoride) or an elastomer, and a solvent are mixed to prepare a coating slurry. The coating slurry is applied to the second active material layer 122 and is dried to form the second solid electrolyte layer 13. For example, the second solid electrolyte layer 13 covers the surface of the second active material layer 122.

If necessary, the coating solution used to form the second solid electrolyte layer 13 may contain the organic compound in an amount of 0.5% or more by mass and 10% or less by mass of the total solid content. The organic compound in an amount of 0.5% or more by mass of the total solid content in the coating solution can sufficiently maintain the thickness of the second solid electrolyte layer 13 and therefore improves the function of preventing an electrical short circuit in the entire solid electrolyte layer. The organic compound in an amount of 10% or less by mass of the total solid content in the coating solution can cause a smaller increase in the electrical resistance of the second solid electrolyte layer 13 and therefore allows an increase in the capacity and power of the battery.

The second solid electrolyte layer 13 can be formed by a coating method, such as a die coating method, a doctor blade method, a roll coater method, or a screen printing method, and may be formed by another method.

In this way, a layered body including the second solid electrolyte layer 13 on the second electrode 12 is formed on the second electrode side.

The layered body on the first electrode side is bonded to the layered body on the second electrode side such that the first solid electrolyte layer 11 faces the second solid electrolyte layer 13. Thus, the cell 1 is produced.

Although the first electrode 10 is a negative electrode and the second electrode 12 is a positive electrode in the present embodiment, the first electrode 10 may be a positive electrode and the second electrode 12 may be a negative electrode. In such a case, the solid electrolyte layer on the positive electrode side is the first solid electrolyte layer 11, and the solid electrolyte layer on the negative electrode side is the second solid electrolyte layer 13. Thus, the solid electrolyte layer on the positive electrode side has a smaller thickness and a smaller organic compound content than the solid electrolyte layer on the negative electrode side. Such a structure can also prevent a short circuit, increase the capacity, and stabilize the capacity quality.

The cell according to the present embodiment may constitute a stacked all-solid-state battery. The cells according to the present embodiment are stacked as basic constituents, that is, as unit cells to constitute the all-solid-state battery.

Figure 2:
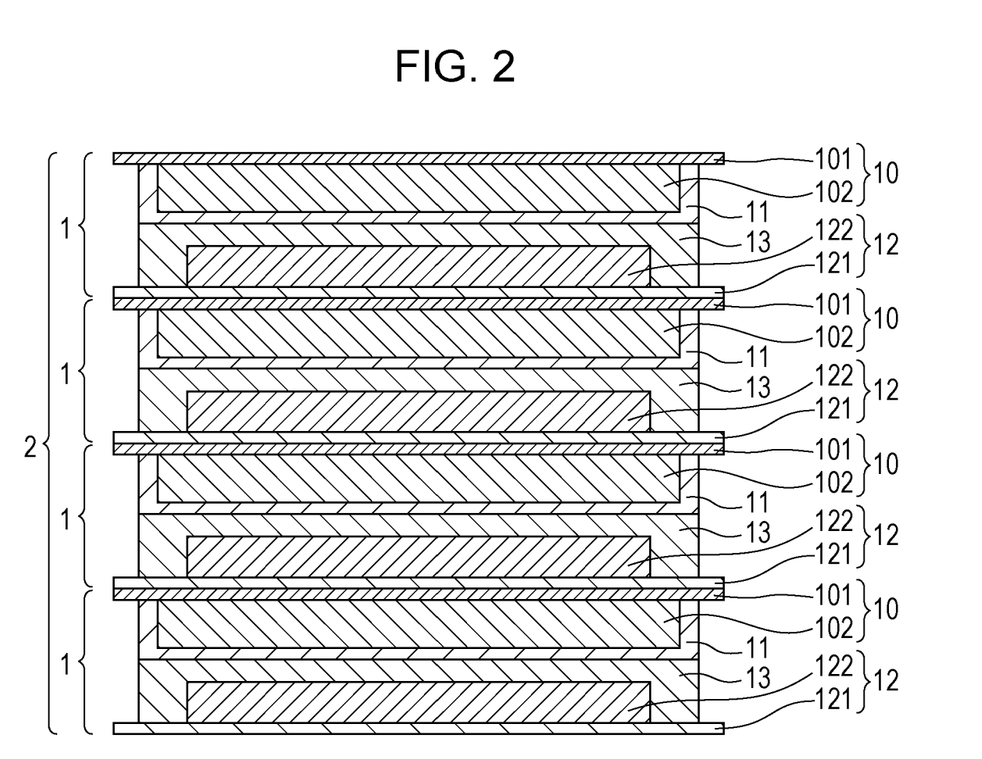
FIG. 2 is a schematic cross-sectional view of a first example of a stacked all-solid-state battery in which the cells illustrated in FIG. 1 are stacked.

FIG. 2 is a schematic cross-sectional view of a first example of a stacked all-solid-state battery in which the cells 1 illustrated in FIG. 1 are stacked. In the stacked all-solid-state battery 2 according to the first example, two adjacent cells 1 are stacked by bonding the first current collector 101 of one of the cells 1 to the second current collector 121 of the other cell 1. Thus, the stacked all-solid-state battery 2 according to the first example is a stacked battery composed of a plurality of cells 1 electrically connected in series. The first current collector 101 and the second current collector 121 may be directly bonded together or may be bonded together via an electrically conductive adhesive or by a welding method.

Figure 3:
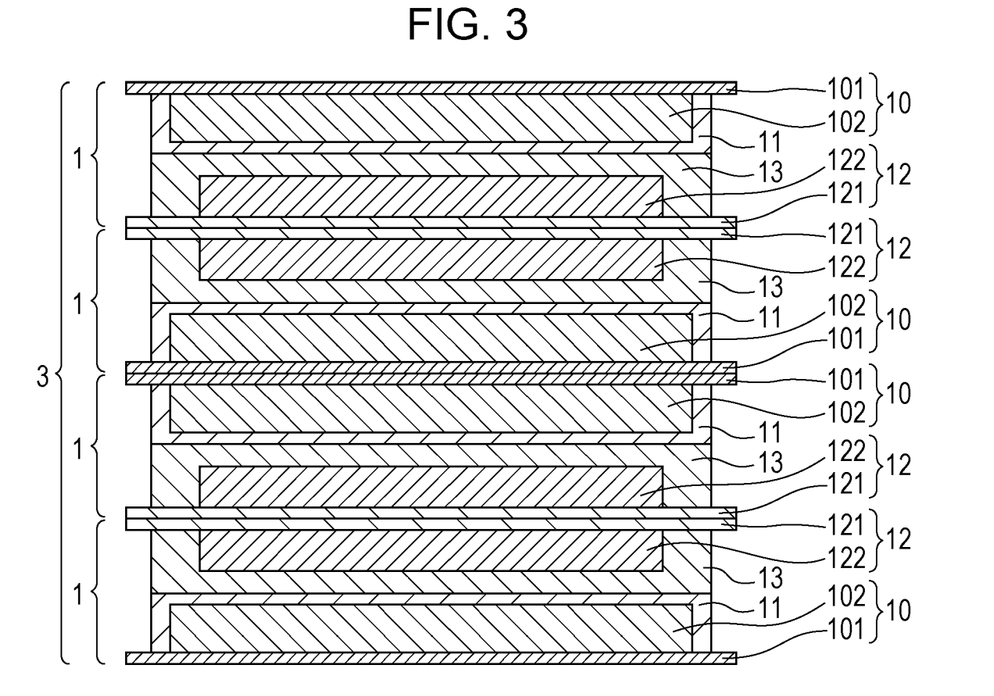
FIG. 3 is a schematic cross-sectional view of a second example of a stacked all-solid-state battery in which the cells illustrated in FIG. 1 are stacked.

FIG. 3 is a schematic cross-sectional view of a second example of a stacked all-solid-state battery in which the cells 1 illustrated in FIG. 1 are stacked. In a stacked all-solid-state battery 3 according to the second example, two adjacent cells 1 are stacked by bonding the first current collector 101 of one of the cells 1 to the first current collector 101 of the other cell 1 and bonding the second current collector 121 of one of the cells 1 to the second current collector 121 of the other cell 1. Thus, the stacked all-solid-state battery 3 according to the second example is a stacked battery composed of a plurality of cells 1 electrically connected in parallel. The first current collectors 101 and the second current collectors 121 may be directly bonded together or may be bonded together via an electrically conductive adhesive or by a welding method.

Figure 4:
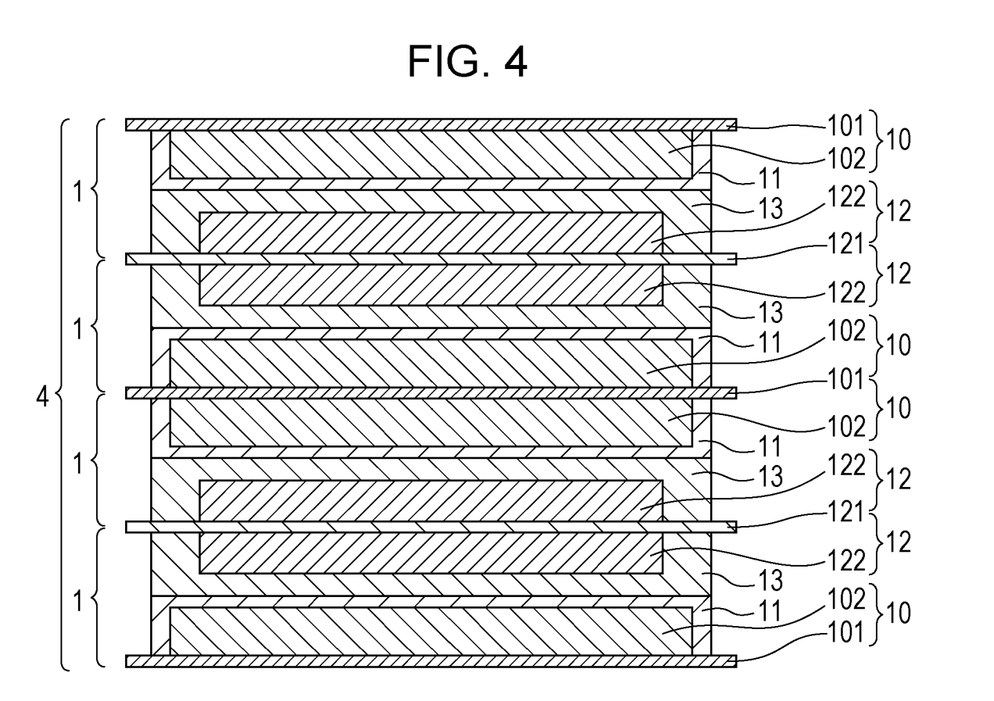
FIG. 4 is a schematic cross-sectional view of a third example of a stacked all-solid-state battery in which the cells illustrated in FIG. 1 are stacked.

FIG. 4 is a schematic cross-sectional view of a third example of a stacked all-solid-state battery in which the cells 1 illustrated in FIG. 1 are stacked. In a stacked all-solid-state battery 4 according to the third example, two adjacent cells 1 in the stacked all-solid-state battery 3 illustrated in FIG. 3 share one first current collector 101 and two adjacent cells 1 in the stacked all-solid-state battery 3 illustrated in FIG. 3 share one second current collector 121. Like the stacked all-solid-state battery 3 according to the second example, the stacked all-solid-state battery 4 according to the third example is a stacked battery composed of a plurality of cells 1 electrically connected in parallel.

The stacked all-solid-state battery 4 can be formed, for example, by the following method.

A first member and a second member are prepared. In the first member, the first active material layer 102 and the first solid electrolyte layer 11 are formed on the upper and lower surfaces of the first current collector 101. In the second member, the second active material layer 122 and the second solid electrolyte layer 13 are formed on the upper and lower surfaces of the second current collector 121. The first member is bonded to the second member such that the first solid electrolyte layer 11 faces the second solid electrolyte layer 13. Thus, a stacked battery composed of a plurality of cells 1 stacked as illustrated in FIG. 4 can be formed. At the top or bottom of the stacked all-solid-state battery 4, an active material layer and a solid electrolyte layer are formed on only one surface of the first current collector 101 or the second current collector 121.

In another method, a first member and a second member may be stacked, wherein the first member includes the first active material layer 102, the first solid electrolyte layer 11, the second solid electrolyte layer 13, and the second active material layer 122 sequentially stacked on the upper surface of the first current collector 101, and the second member includes the second active material layer 122, the second solid electrolyte layer 13, the first solid electrolyte layer 11, and the first active material layer 102 sequentially stacked on the upper surface of the second current collector 121. A stacked battery composed of a plurality of cells 1 stacked as illustrated in FIG. 4 can also be formed by this method.

Figure 5:
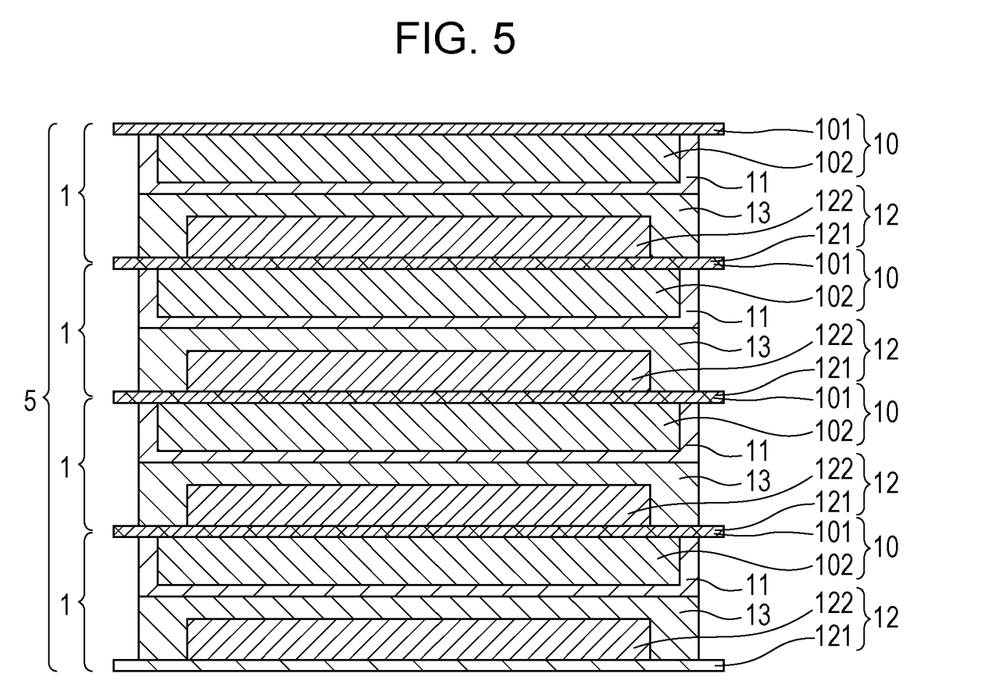
FIG. 5 is a schematic cross-sectional view of a fourth example of a stacked all-solid-state battery in which the cells illustrated in FIG. 1 are stacked.

FIG. 5 is a schematic cross-sectional view of a fourth example of a stacked all-solid-state battery in which the cells 1 illustrated in FIG. 1 are stacked. In a stacked all-solid-state battery 5 according to the fourth example, the first current collector 101 and the second current collector 121 of two adjacent cells 1 in the stacked all-solid-state battery 2 illustrated in FIG. 2 share one current collector. Like the stacked all-solid-state battery 2 according to the first example, the stacked all-solid-state battery 5 according to the fourth example is a stacked battery composed of a plurality of cells 1 electrically connected in series.

The stacked all-solid-state battery 5 can be formed, for example, by the following method.

A current collector serving as both the first current collector 101 and the second current collector 121 is prepared. The first active material layer 102 and the first solid electrolyte layer 11 are formed on the lower surface of the current collector, and the second active material layer 122 and the second solid electrolyte layer 13 are formed on the upper surface of the current collector. A plurality of such members are prepared and bonded together such that the first solid electrolyte layer 11 faces the second solid electrolyte layer 13. Thus, a stacked battery composed of a plurality of cells 1 stacked as illustrated in FIG. 5 can be formed. The first current collector 101 or the second current collector 121 is located at the top or bottom of the stacked all-solid-state battery 5.

In another method, a plurality of members in which the first active material layer 102, the first solid electrolyte layer 11, the second solid electrolyte layer 13, and the second active material layer 122 are sequentially stacked on the upper surface of the first current collector 101 may be prepared and stacked. In the stack, the first current collector 101 can function as the second current collector 121. A stacked battery composed of a plurality of cells 1 stacked as illustrated in FIG. 5 can also be formed by this method.

Although some embodiments of a battery according to the present disclosure are specifically described above, the present disclosure is not limited to these embodiments. The present disclosure is widely applicable to batteries with high reliability and good capacity characteristics.

A battery according to the present disclosure can be suitably used in various electronic devices, electrical appliances and devices, and electric vehicles.

What is claimed is:

1. A battery comprising:
    a first electrode comprising a first current collector and a first active material layer;
    a first solid electrolyte layer in contact with the first active material layer;
    a second electrode comprising a second current collector and a second active material layer; and
    a second solid electrolyte layer located between the second active material layer and the first solid electrolyte layer and in contact with the second electrode and the first solid electrolyte layer,
    wherein an organic compound content of the first solid electrolyte layer is smaller than an organic compound content of the second solid electrolyte layer,
    a thickness of the first solid electrolyte layer is smaller than a thickness of the second solid electrolyte layer,
    the first solid electrolyte layer has a thickness of 0.5 μm or more and 5 μm or less, and the second solid electrolyte layer has a thickness of 3 μm or more and 50 μm or less,
    the second solid electrolyte layer does not cover an entire side surface of the second active material layer, and
    the second solid electrolyte layer is only located between the second active material layer and the first solid electrolyte layer.

2. The battery according to claim 1, wherein the organic compound content of the first solid electrolyte layer is 0.5% or less by mass.

3. The battery according to claim 1, wherein the first solid electrolyte layer has a thickness of 1 μm or more and 3 μm or less.

4. The battery according to claim 1, wherein the second solid electrolyte layer has a thickness of 5 μm or more and 30 μm or less.

5. The battery according to claim 1, wherein
    the first solid electrolyte layer is only disposed between the first electrode and the second solid electrolyte layer.

6. The battery according to claim 5, wherein
    the first solid electrolyte layer does not cover an entire side surface of the first active material layer, and
    the first solid electrolyte layer is only located between the first active material layer and the second solid electrolyte layer.

* * * * *